United States Patent
Nagashima (10) Patent No.: US 10,632,422 B2
(45) Date of Patent: Apr. 28, 2020

(54) EXHAUST GAS PURIFICATION SYSTEM FOR INTERNAL COMBUSTION ENGINE AND EXHAUST GAS PURIFICATION METHOD FOR INTERNAL COMBUSTION ENGINE

(71) Applicant: ISUZU MOTORS LIMITED, Shinagawa-ku, Tokyo (JP)

(72) Inventor: Youhei Nagashima, Yamato (JP)

(73) Assignee: ISUZU MOTORS LIMITED, Shinagawa-Ku, Tokyo (JP)

( * ) Notice: Subject to any disclaimer, the term of this patent is extended or adjusted under 35 U.S.C. 154(b) by 0 days.

(21) Appl. No.: 16/098,431

(22) PCT Filed: Apr. 28, 2017

(86) PCT No.: PCT/JP2017/016957
§ 371 (c)(1),
(2) Date: Nov. 1, 2018

(87) PCT Pub. No.: WO2017/191813
PCT Pub. Date: Nov. 9, 2017

(65) Prior Publication Data
US 2019/0143271 A1 May 16, 2019

(30) Foreign Application Priority Data

May 2, 2016 (JP) .................... 2016-092375

(51) Int. Cl.
*F01N 1/00* (2006.01)
*B01D 53/94* (2006.01)
(Continued)

(52) U.S. Cl.
CPC .............. *B01D 53/94* (2013.01); *F01N 3/08* (2013.01); *F01N 3/106* (2013.01); *F01N 3/18* (2013.01);
(Continued)

(58) Field of Classification Search
CPC ... B01D 53/94; F01N 3/08; F01N 3/18; F01N 3/106; F01N 3/2066
(Continued)

(56) References Cited

U.S. PATENT DOCUMENTS 8,091,343 B2 * 1/2012 Ichikawa .............. F01N 3/2066
60/274
2008/0216467 A1 9/2008 Bruck
(Continued)

FOREIGN PATENT DOCUMENTS

JP 2009-510333 A 3/2009
JP 2010-031731 A 2/2010
(Continued)

OTHER PUBLICATIONS

International Search Report and Written Opinion for related International Application No. PCT/JP2017/016957 dated Jun. 6, 2017; English translation of ISR provided; 8 pages.
(Continued)

*Primary Examiner* — Jason D Shanske
(74) *Attorney, Agent, or Firm* — Procopio, Cory, Hargreaves & Savitch LLP (57) ABSTRACT

A first temperature which is a temperature of exhaust gas which has passed through an exhaust gas purification treatment device is detected during supply of urea water from a urea water supply device, and a second temperature which is a temperature of exhaust gas which has passed through a second exhaust gas purification treatment device in a state where an engine in the same operating state as when the first temperature is detected and the supply of the urea water from the urea water supply device is stopped is calculated from preset data. Further, an ammonia calorific value which is an amount of heat generated in an ammonia slip catalyst device by oxidation of ammonia is calculated based on the
(Continued)

first temperature and the second temperature, and an ammonia slip amount from the selective reduction catalyst device is calculated based on the ammonia calorific value.

9 Claims, 7 Drawing Sheets

(51) Int. Cl.
*F01N 3/10* (2006.01)
*F01N 3/20* (2006.01)
*F01N 3/08* (2006.01)
*F01N 3/18* (2006.01)
*F01N 13/00* (2010.01)

(52) U.S. Cl.
CPC .......... *F01N 3/208* (2013.01); *F01N 3/2066* (2013.01); *F01N 13/009* (2014.06); *F01N 2550/05* (2013.01); *F01N 2560/06* (2013.01); *F01N 2610/02* (2013.01); *F01N 2900/1404* (2013.01); *F01N 2900/1614* (2013.01); *F01N 2900/1616* (2013.01); *Y02T 10/24* (2013.01)

(58) Field of Classification Search
USPC .......................................................... 60/272
See application file for complete search history.

(56) References Cited

U.S. PATENT DOCUMENTS

| | | |
|---|---|---|
| 2009/0272101 A1 | 11/2009 | Wills et al. |
| 2010/0024401 A1 | 2/2010 | Ichikawa |
| 2011/0005202 A1* | 1/2011 | Gady ...................... F01N 3/208 60/276 |
| 2011/0083429 A1* | 4/2011 | Sato ........................ F01N 3/106 60/299 |
| 2012/0060478 A1* | 3/2012 | Vernassa ................. F01N 3/103 60/274 |
| 2012/0310507 A1 | 12/2012 | Auckenthaler |
| 2015/0139860 A1 | 5/2015 | Devarakonda |

FOREIGN PATENT DOCUMENTS

| | | |
|---|---|---|
| JP | 2012-087628 A | 5/2012 |
| JP | 2013-515897 A | 5/2013 |
| JP | 2015-098869 A | 5/2015 |

OTHER PUBLICATIONS

Extended European Search Report for related EP App No. 17792746.4 dated Feb. 12, 2019, 8 pgs.

* cited by examiner

EXHAUST GAS PURIFICATION SYSTEM FOR INTERNAL COMBUSTION ENGINE AND EXHAUST GAS PURIFICATION METHOD FOR INTERNAL COMBUSTION ENGINE

CROSS-REFERENCE TO RELATED APPLICATIONS

This application is a U.S. National Stage entry of PCT Application No: PCT/JP2017/016957 filed on Apr. 28, 2017, which claims priority to Japanese Patent Application No. 2016-092375, filed May 2, 2016, the contents of which are incorporated herein by reference.

TECHNICAL FIELD

The present disclosure relates to an exhaust gas purification system for an internal combustion engine and an exhaust gas purification method for an internal combustion engine.

BACKGROUND ART

A selective reduction catalyst device (SCR) is provided as one of exhaust gas purification treatment devices in an exhaust passage of an internal combustion engine such as a diesel engine mounted on a vehicle (for example, see Patent Document 1). The selective reduction catalyst device (SCR) is a device that reduces and purifies $NO_X$ contained in exhaust gas with ammonia ($NH_3$) generated by hydrolyzing urea water injected toward the exhaust gas from a urea water supply device provided in the exhaust passage on an upstream side by heat of the exhaust gas.

PRIOR ART DOCUMENT

Patent Document

Patent Document 1: JP-A-2013-515897

SUMMARY OF INVENTION

Problems to Be Solved by Invention

However, when a supply amount of the urea water from the urea water supply device becomes excessive, a generation amount of the ammonia may become excessive and a part of the ammonia may slip to a downstream side of the selective reduction catalyst device. If an ammonia slip amount can be calculated with high accuracy, the accuracy of failure diagnosis improves, and the urea water can be supplied from the urea water supply device without excess or deficiency in the reduction of $NO_X$ in the exhaust gas, but a good method of calculating the ammonia slip amount has not been proposed.

An object of the present disclosure is to provide an exhaust gas purification system for an internal combustion engine and an exhaust gas purification method for an internal combustion engine in which the ammonia slip amount at an outlet of the selective reduction catalyst device can be calculated with high accuracy.

Means for Solving Problems

An exhaust gas purification system for an internal combustion engine for achieving the above object is an exhaust gas purification system for an internal combustion engine, in which an exhaust passage of the internal combustion engine includes, in order from an upstream side: a urea water supply device; an exhaust gas purification treatment device; and a downstream temperature detecting device, the exhaust gas purification treatment device including: a selective reduction catalyst device group including at least one selective reduction catalyst device; and an oxidation catalyst device arranged at a downstream side of the selective reduction catalyst device group, wherein a control device which controls the exhaust gas purification system is configured to: detect, by the downstream temperature detecting device, a first temperature which is a temperature of exhaust gas which has passed through the exhaust gas purification treatment device during supply of urea water from the urea water supply device; calculate, from preset data, a second temperature which is a temperature of exhaust gas which has passed through the exhaust gas purification treatment device in a state where the engine is in a same operating state as when the first temperature is detected and the supply of the urea water from the urea water supply device is stopped; and calculate, based on the first temperature and the second temperature, an ammonia calorific value which is an amount of heat generated by the oxidation catalyst device by oxidation of ammonia which has been generated from the urea water supplied from the urea water supply device, and calculate an ammonia slip amount from the selective reduction catalyst device group based on the ammonia calorific value.

Further, an exhaust gas purification method for an internal combustion engine for achieving the above object is an exhaust gas purification method for an internal combustion engine in which an exhaust passage of the internal combustion engine includes, in order from an upstream side: a urea water supply device; and an exhaust gas purification treatment device, the exhaust gas purification treatment device including: a selective reduction catalyst device group including at least one selective reduction catalyst device; and an oxidation catalyst device arranged at a downstream side of the selective reduction catalyst device group, the exhaust gas purification method comprising: detecting a first temperature which is a temperature of exhaust gas which has passed through the exhaust gas purification treatment device during supply of urea water from the urea water supply device; calculating, from preset data, a second temperature which is a temperature of exhaust gas which has passed through the exhaust gas purification treatment device in a state where the engine is in a same operating state as when the first temperature is detected and the supply of the urea water from the urea water supply device is stopped; and calculating, based on the first temperature and the second temperature, an ammonia calorific value which is an amount of heat generated by the oxidation catalyst device by oxidation of ammonia which has been generated from the urea water supplied from the urea water supply device, and calculating an ammonia slip amount from the selective reduction catalyst device group based on the ammonia calorific value.

Effect of Invention

According to the exhaust gas purification system for an internal combustion engine and the exhaust gas purification method for an internal combustion engine of the present disclosure, the ammonia slip amount at an outlet of the selective reduction catalyst device group can be calculated with high accuracy.

Further, by using the calculated value of the ammonia slip amount, the diagnostic accuracy of the purification rate of the selective reduction catalyst device group and the accuracy of the supply control of the urea water from the urea water supply device can be improved.

Further, since it is not necessary to provide an ammonia concentration detection sensor at the outlet of the selective reduction catalyst device group, the cost can be reduced.

DESCRIPTION OF EMBODIMENTS

Hereinafter, an exhaust gas purification system for an internal combustion engine and an exhaust gas purification method for an internal combustion engine of an embodiment according to the present disclosure will be described with reference to the drawings. Incidentally, in the present embodiment, the number of selective reduction catalyst device configuring a selective reduction catalyst device group provided in an exhaust gas purification treatment device is one, but a plurality of selective reduction catalyst devices may be provided.

Figure 1:
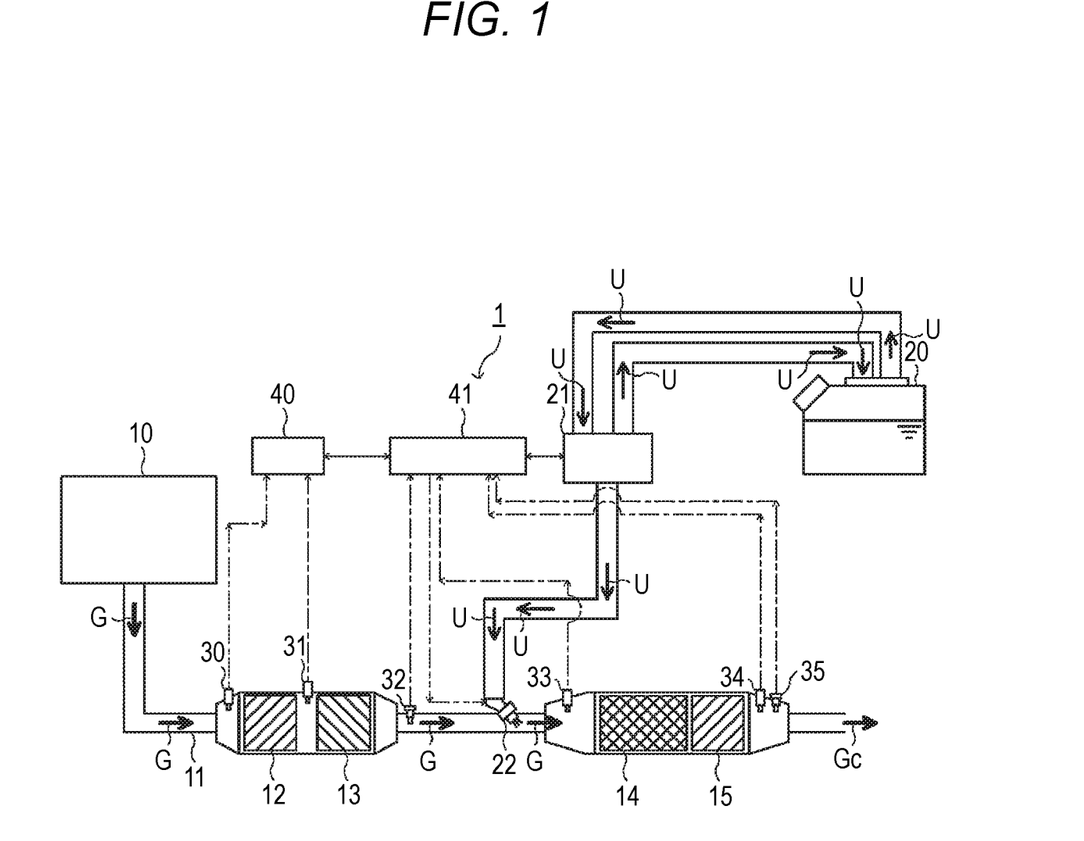
FIG. 1 is a diagram schematically showing a configuration of an exhaust gas purification system for an internal combustion engine according to an embodiment of the present disclosure.

As shown in FIG. 1, the exhaust gas purification system 1 for an internal combustion engine of the embodiment according to the present disclosure is a system including an oxidation catalyst device (DOC) 12, a particulate collecting device (CSF) 13, a urea water supply device 22, a selective reduction catalyst device 14 and an ammonia slip catalyst device (oxidation catalyst device (DOC)) 15 which are provided in an exhaust passage 11 of an engine (internal combustion engine) 10 in order from an upstream side (engine side).

Exhaust gas G of the engine 10 passes through the devices 12 to 15 configuring the exhaust gas purification system 1, so that components to be purified, such as particulate matter (PM) and nitrogen oxides ($NO_X$) contained in the exhaust gas G are purified, and purified exhaust gas Gc is discharged to the atmosphere via a muffler (not shown) or the like.

In FIG. 1, the oxidation catalyst device 12 and the particulate collecting device 13 configure a first exhaust gas purification treatment device; a selective reduction catalyst device 14 and an ammonia slip catalyst device 15 configure a second exhaust gas purification treatment device.

The oxidation catalyst device 12 is a device that oxidizes hydrocarbon (HC) and nitrogen monoxide (NO) contained in the exhaust gas G. Particularly, when the exhaust gas G is at a low temperature, as a ratio of nitrogen monoxide (NO) and nitrogen dioxide ($NO_2$) contained in the exhaust gas G approaches 1:1, a $NO_X$ purification rate in the selective reduction catalyst device 14 on a downstream side increases, and thus nitrogen monoxide (NO) is oxidized to increase a proportion of nitrogen dioxide ($NO_2$) in the oxidation catalyst device 12.

The particulate collecting device 13 is a device that collects PM contained in the exhaust gas G. There is an upper limit to an amount (collection amount) of PM that can be collected in the particulate collecting device 13, and as the collection amount of PM approaches the upper limit, a differential pressure across the particulate collecting device 13 rises and the performance of the engine 10 is deteriorated. Therefore, a forced PM regeneration control of the particulate collecting device 13 is regularly performed so as to burn and remove the PM collected in the particulate collecting device 13.

The selective reduction catalyst device 14 is a device that reduces and purifies $NO_X$ contained in the exhaust gas G with ammonia ($NH_3$) which is generated by hydrolyzing urea water U injected toward the exhaust gas G from the urea water supply device 22 provided in the exhaust passage 11 on the upstream by heat of the exhaust gas G.

The selective reduction catalyst device 14 can store ammonia in a supported catalyst and mainly reduces and purifies $NO_X$ contained in the exhaust gas G with the stored ammonia. However, there is an upper limit to an amount (storage amount) of ammonia that can be stored, and ammonia that exceeds the upper limit and cannot be stored any more is discharged to the exhaust passage 11 on the downstream side of the selective reduction catalyst device 14.

Incidentally, the hydrolysis reaction of the urea water U to the ammonia in the selective reduction catalyst device 14 is performed based on a chemical formula such as "$(NH_2)_2CO + H_2O \rightarrow NH_3 + HNCO$" (when the temperature of the exhaust gas G is extremely low), or "$HNCO + H_2O \rightarrow NH_3 + CO_2$" (when the temperature of the exhaust gas G is low). Further, the oxidation-reduction reaction of ammonia and $NO_X$ in the selective reduction catalyst device 14 is performed based on a chemical formula such as "$NO + NO_2 + 2NH_3 \rightarrow 2N_2 + 3H_2O$", "$4NO + 4NH_3 + O_2 \rightarrow 4N_2 + 6H_2O$", or "$4NO_2 + 4NH_3 \rightarrow 4N_2 + 6H_2O + O_2$".

The ammonia slip catalyst device 15 is a device that oxidizes the ammonia discharged from the selective reduction catalyst device 14 on an upstream side to nitrogen ($N_2$) or $NO_X$. The oxidation reaction is performed based on a chemical formula such as "$4NH_3 + 5O_2 \rightarrow 4NO + 6H_2O$", "$2NH_3 + 2O_2 \rightarrow N_2O + 3H_2O$", or "$4NH_3 + 3O_2 \rightarrow 2N_2 + 6H_2O$". When the injection amount of the urea water U from the urea water supply device 22 is excessive, the amount of ammonia discharged from the selective reduction catalyst device 14 increases, the amount of $NO_X$ generated by oxidizing ammonia in the ammonia slip catalyst device 15 also increases, and thus the $NO_X$ purification rate of the exhaust gas purification system as a whole decreases.

Further, the urea water supply device 22 is connected to a urea water storage tank 20 that stores the urea water U via a urea water supply pump 21. The urea water supply pump 21 is operated by a control signal from a urea water supply control device (DCU) 41 described later, so that a part of the urea water U stored in the urea water storage tank 20 is supplied to the urea water supply device 22 via the urea water supply pump 21. The urea water U supplied to the urea water supply device 22 is injected toward the exhaust gas G passing through the exhaust passage 11 by opening an injection valve (not shown) of the urea water supply device 22 by a control signal from the urea water supply control device 41.

Further, an upstream temperature sensor for oxidation catalyst device 30 and a downstream temperature sensor for oxidation catalyst device 31 are respectively provided on an inlet side (upstream side) and an outlet side (downstream side) of the oxidation catalyst device 12; an upstream temperature sensor 33 is provided on an inlet side (upstream side) of the selective reduction catalyst device 14; and a downstream temperature sensor 34 (downstream temperature detecting device) is provided on an outlet side (downstream side) of the ammonia slip catalyst device 15.

Further, an upstream $NO_X$ concentration sensor (upstream $NO_X$ concentration detecting device) 32 is provided in the exhaust passage 11 between the particulate collecting device 13 and the urea water supply device 22; and a downstream $NO_X$ concentration sensor (downstream $NO_X$ concentration detecting device) 35 is provided on the outlet side (downstream side) of the ammonia slip catalyst device 15.

Further, an engine control device (ECU) 40 and the urea water supply control device (DCU) 41 are provided. The engine control device 40 is a device that controls an operating state of the engine 10 based on data such as detection values of the upstream temperature sensor for oxidation catalyst device 30 and the downstream temperature sensor for oxidation catalyst device 31, temperature of engine cooling water, atmospheric pressure, the temperature and flow rate of intake air flowing into the engine 10, and the flow rate of fuel injected into a cylinder (not shown) of the engine 10.

The urea water supply control device 41 is a device that controls an operating state of the urea water supply pump 21 and the urea water supply device 22 based on data input to the engine control device 40 and then acquired from the engine control device 40, or data (for example, a detection value of the upstream temperature sensor 33, or the like) directly input to the urea water supply control device 41.

In the exhaust gas purification system 1 for an internal combustion engine of the embodiment according to the present disclosure, the urea water supply control device (a control device that controls the exhaust gas purification system 1) 41 detects, by the downstream temperature sensor 34, first temperature T1 which is the temperature of the exhaust gas Gc which has passed through the second exhaust gas purification treatment device during supply of the urea water U from the urea water supply device 22; and calculates, from preset data, second temperature T2 which is the temperature of the exhaust gas Gc which has passed through the second exhaust gas purification treatment device in the same operating state of the engine 10 as when the first temperature T1 is detected and in a state where the supply of the urea water U from the urea water supply device 22 is stopped. As the preset data used for calculating the second temperature T2, for example, a control map (model) ("control map for T2" in FIG. 3) in which the second temperature T2 is set in accordance with the operating state of the engine 10, which is prepared in advance by experiments and stored in the urea water supply control device 41, is used.

The urea water supply control device 41 calculates, based on the first temperature T1 and the second temperature T2, an ammonia calorific value C which is the amount of heat generated in the ammonia slip catalyst device 15 by oxidation of ammonia which is generated by hydrolysis from the urea water U supplied from the urea water supply device 22; and calculates an ammonia slip amount S from the selective reduction catalyst device 14 based on the ammonia calorific value C.

Then, a urea water supply amount is calculated based on the calculated ammonia slip amount S, and the urea water is supplied with the calculated urea water supply amount. Alternatively, based on the calculated ammonia slip amount S, the urea water supply device 22 and the exhaust gas purification treatment device, particularly the selective reduction catalyst device 14 and the ammonia slip catalyst device 15, are subjected to failure diagnosis.

Figure 2:
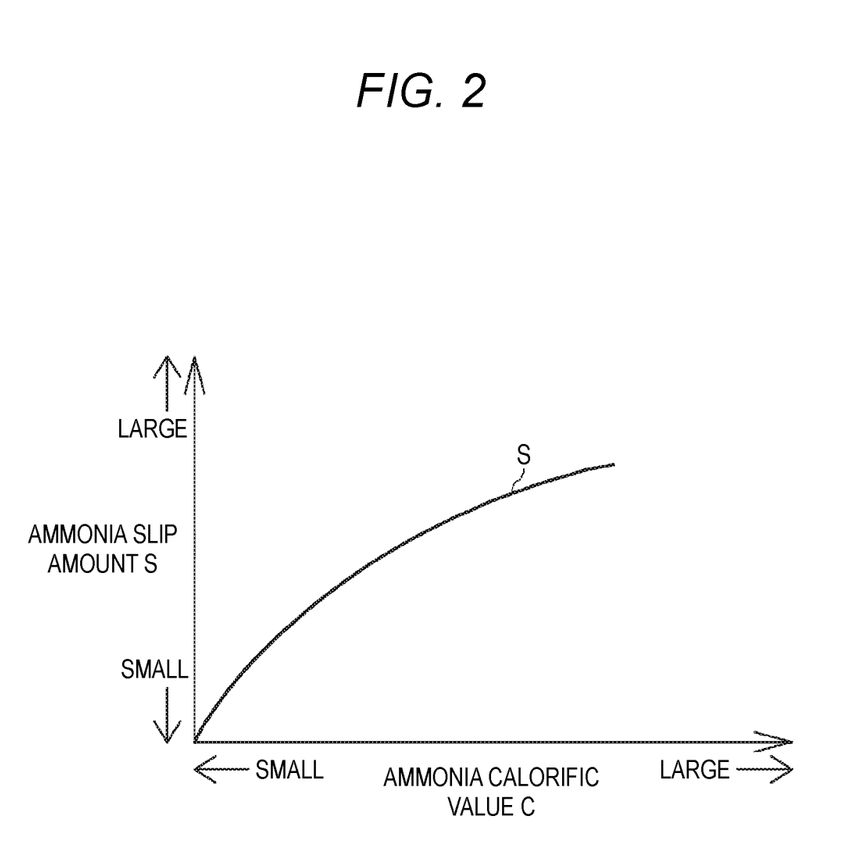
FIG. 2 is a diagram showing a relationship between an ammonia calorific value and an ammonia slip amount.

Incidentally, the calculation of the ammonia calorific value C and the ammonia slip amount S is performed every time a control time set in advance by experiments or the like is elapsed during the operation of the engine 10 by the urea water supply control device 41. Further, the ammonia calorific value C is calculated by multiplying a difference $\Delta T$ $(=T1-T2)$ between the first temperature T1 and the second temperature T2 by a flow rate F of the exhaust gas Gc $(C=\Delta T \times F)$. Further, the ammonia slip amount S is calculated based on the ammonia calorific value C by, for example, the following method. First, a control map (see FIG. 2) showing the relationship between the ammonia calorific value C and the ammonia slip amount S is prepared in advance and stored in the urea water supply control device 41. Then, the ammonia slip amount S is calculated by comparing the calculated ammonia calorific value C with the control map.

According to such a configuration, the ammonia calorific value C generated by the oxidation of the ammonia slipping from the selective reduction catalyst device 14 by the ammonia slip catalyst device 15 on the downstream side is calculated based on a rise amount $\Delta T$ (=first temperature T1−second temperature T2) of the exhaust temperature, and thus the calculation accuracy of the ammonia calorific value C can be improved. As a result, the calculation accuracy of the ammonia slip amount S also can be improved.

Further, in the exhaust gas purification system 1 for an internal combustion engine, the urea water supply control device 41 calculates a total correction coefficient K based on the first temperature T1 (unit: degC), the flow rate F (unit: kg/h) of the exhaust gas G passing through the exhaust passage 11, an upstream $NO_X$ concentration Nud (unit: ppm) which is the detection value of the upstream $NO_X$ concentration sensor 32, an upstream $NO_X$ flow rate Nuf (unit: mg/s) calculated by converting the upstream $NO_X$ concentration Nud, an estimated ammonia storage amount Ns (unit: g) which is an estimated value of the amount of ammonia stored in the selective reduction catalyst device 14, and a ratio R of nitrogen monoxide (NO) to nitrogen dioxide ($NO_2$) contained in the exhaust gas G flowing into the selective reduction catalyst device 14, and corrects the ammonia slip amount S based on the calculated total correction coefficient K.

According to such a configuration, the ammonia slip amount S is corrected based on various parameters (T1, F, Nud, Nuf, Ns, R) related to the $NO_X$ purification rate in the selective reduction catalyst device 14, so that the calculation accuracy of the ammonia slip amount S can be further improved.

Figure 3:
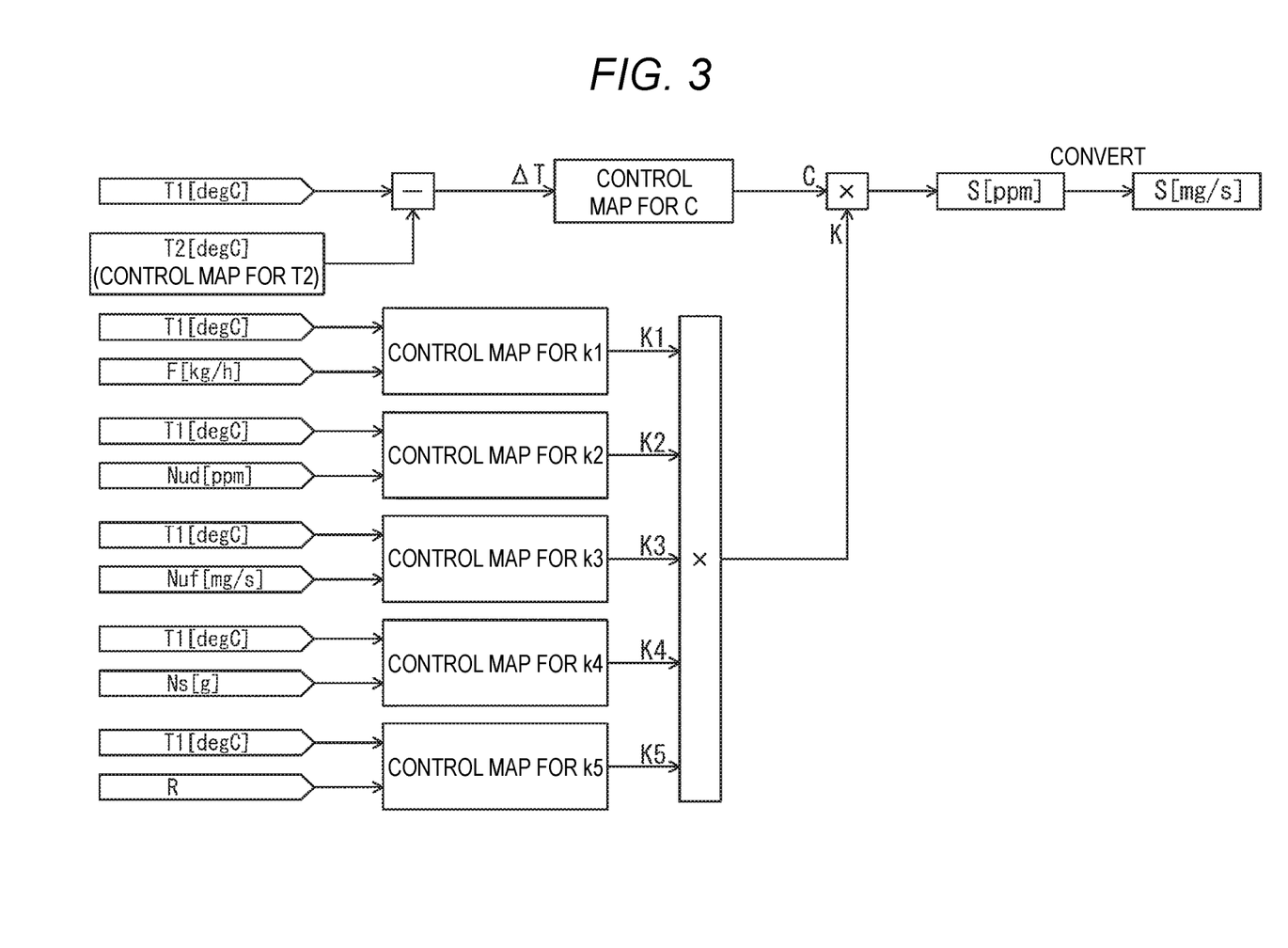
FIG. 3 is a diagram showing a process of calculating the ammonia slip amount based on a first temperature.

Further, in the exhaust gas purification system 1 for an internal combustion engine, as shown in FIG. 3 and FIGS.

4A to 4E, the urea water supply control device 41 calculates the total correction coefficient K (=k1×k2×k3×k4×k5) based on a first correction coefficient k1 calculated based on the first temperature T1 and the flow rate F of the exhaust gas G, a second correction coefficient k2 calculated based on the first temperature T1 and the upstream $NO_X$ concentration Nud, a third correction coefficient k3 calculated based on the first temperature T1 and the upstream $NO_X$ flow rate Nuf, a fourth correction coefficient k4 calculated based on the first temperature T1 and the estimated ammonia storage amount Ns, and a fifth correction coefficient k5 calculated based on the first temperature T1 and the ratio R of nitrogen monoxide to nitrogen dioxide.

Figure 4A:
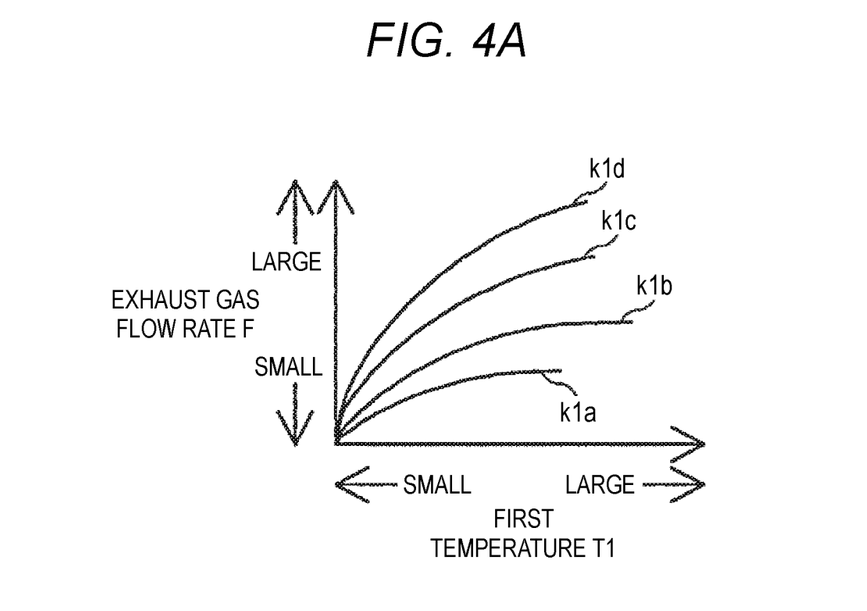
FIG. 4A is a diagram showing a relationship among the first temperature, an exhaust gas flow rate, and a first correction coefficient.
Figure 4B:
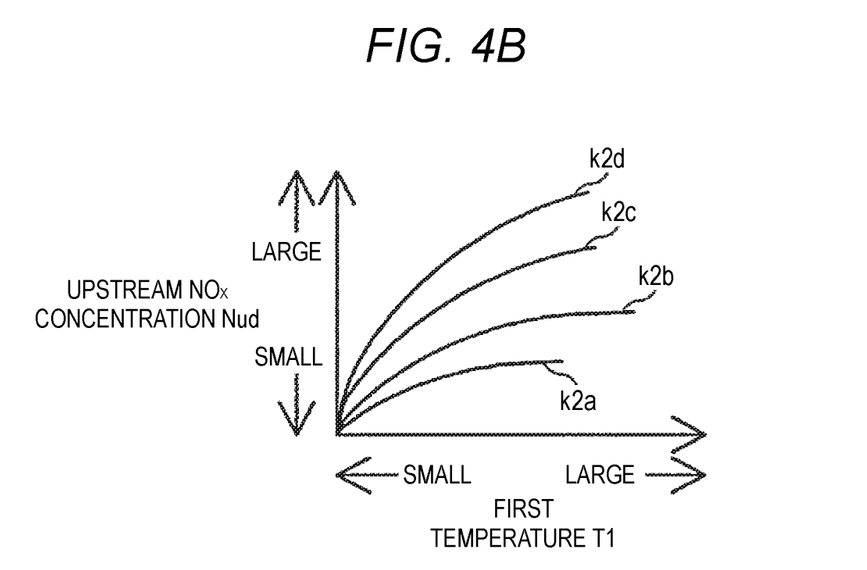
FIG. 4B is a diagram showing a relationship among the first temperature, an upstream $NO_X$ concentration, and a second correction coefficient.
Figure 4C:
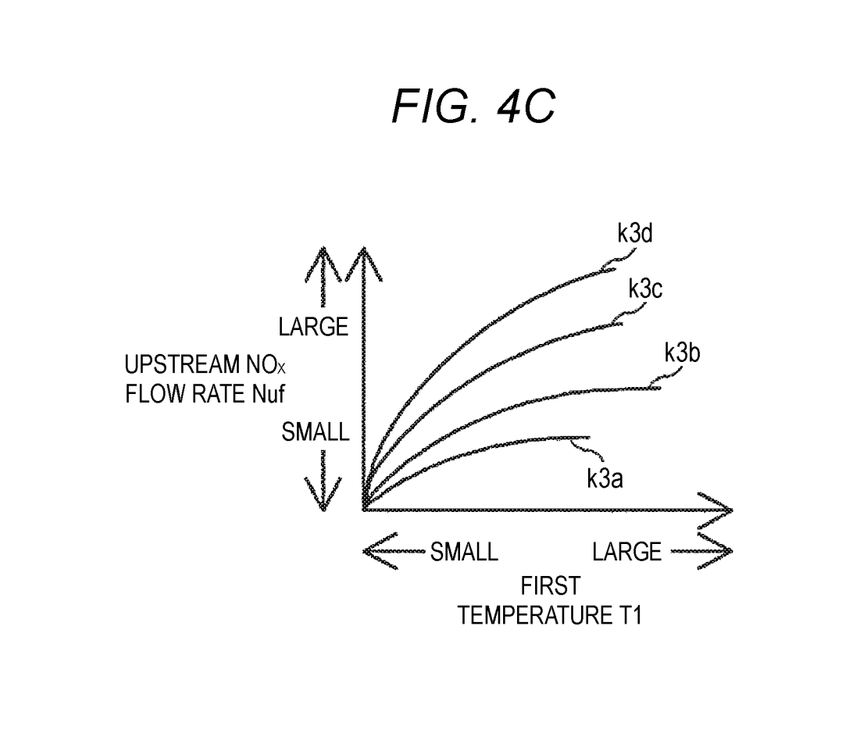
FIG. 4C is a diagram showing a relationship among the first temperature, an upstream $NO_X$ flow rate, and a third correction coefficient.
Figure 4D:
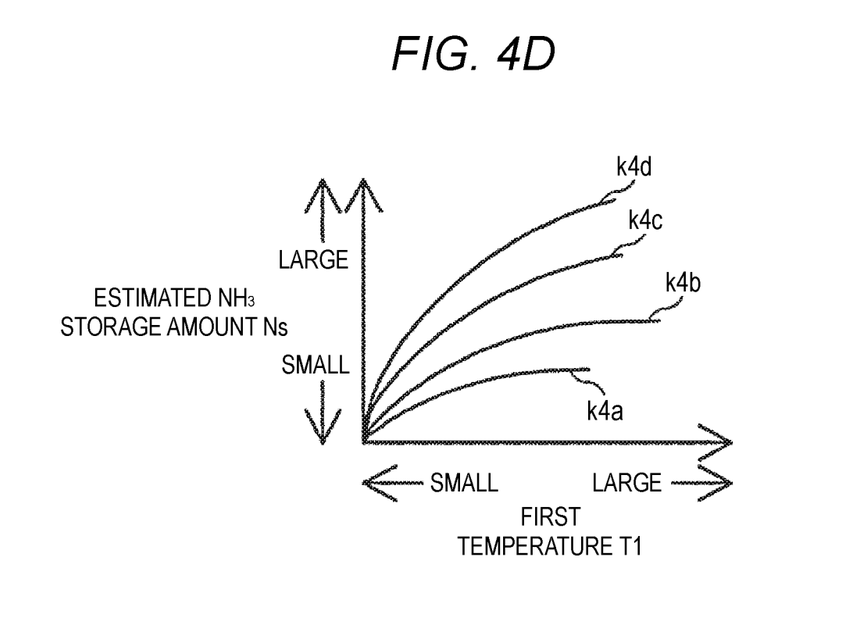
FIG. 4D is a diagram showing a relationship among the first temperature, an estimated ammonia storage amount, and a fourth correction coefficient.
Figure 4E:
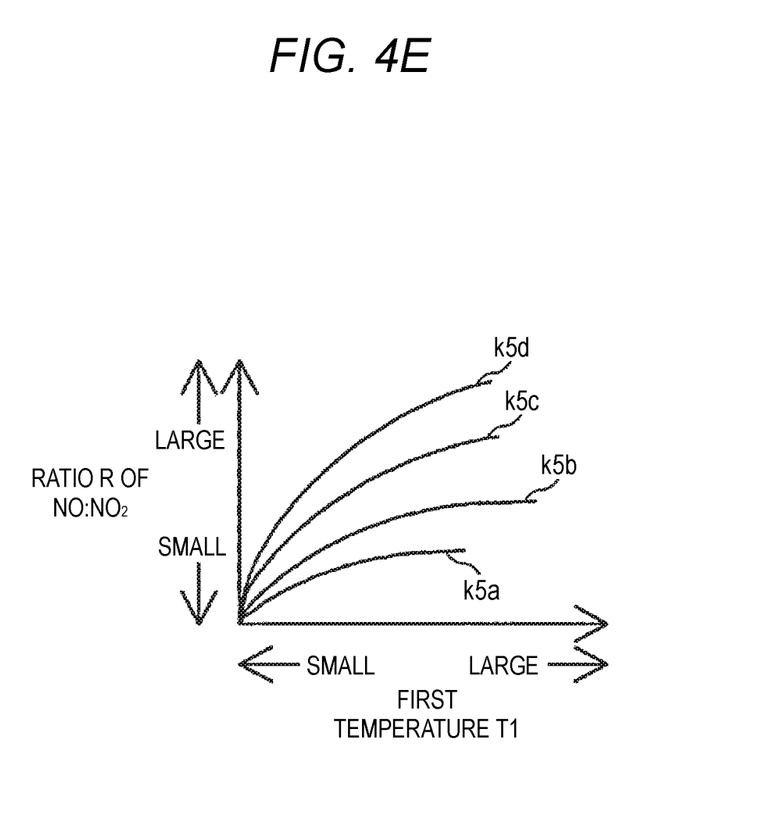
FIG. 4E is a diagram showing a relationship among the first temperature, a ratio R of nitrogen monoxide to nitrogen dioxide contained in the exhaust gas, and a fifth correction coefficient.

Incidentally, the "control map for k1" in FIG. 3 corresponds to FIG. 4A. Further, the "control map for k2" in FIG. 3 corresponds to FIG. 4B. Further, the "control map for k3" in FIG. 3 corresponds to FIG. 4C. Further, the "control map for k4" in FIG. 3 corresponds to FIG. 4D. Further, the "control map for k5" in FIG. 3 corresponds to FIG. 4E.

According to such a configuration, the calculation accuracy of the total correction coefficient K for correcting the ammonia slip amount S can be improved.

Further, in the exhaust gas purification system 1 for an internal combustion engine, the urea water supply control device 41 performs supply amount control of the urea water U by using the ammonia slip amount S calculated as described above. Regarding the supply amount control of the urea water U, there are the following two control methods depending on whether the detection value of the downstream $NO_X$ concentration sensor 35 is used.

The method (first method) without using the detection value of the downstream $NO_X$ concentration sensor 35 is a method in which the urea water supply control device 41 corrects the supply amount of the urea water U from the urea water supply device 22 based on the ammonia slip amount S so that the ammonia slip amount S is not equal to or larger than a set threshold Sc set in advance by experiments or the like.

Further, the method (second method) using the detection value of the downstream $NO_X$ concentration sensor 35 is a method in which the urea water supply control device 41 corrects the supply amount of the urea water U from the urea water supply device 22 based on the ammonia slip amount S, a downstream $NO_X$ concentration Ndd which is the detection value of the downstream $NO_X$ concentration sensor 35, and the estimated ammonia storage amount Ns which is the estimated value of the amount of ammonia stored in the selective reduction catalyst device 14 so that the ammonia slip amount S is not equal to or larger than the set threshold Sc.

A correction amount is added to the supply amount of the urea water U every time the ammonia slip amount S becomes equal to or larger than a second set threshold Sc2 set in advance as a value smaller than the set threshold Sc, or every time the downstream $NO_X$ concentration Ndd becomes equal to or larger than a set threshold Nddc set in advance, or every time the estimated ammonia storage amount Ns becomes equal to or larger than a preset set threshold Nsc.

Here, if the urea water supply control device 41 calculates the estimated ammonia storage amount Ns based on the ammonia slip amount S and a downstream $NO_X$ flow rate Ndf calculated by converting the downstream $NO_X$ concentration Ndd, the estimated ammonia storage amount Ns of the selective reduction catalyst device 14 can be calculated with high accuracy.

A method of calculating the estimated ammonia storage amount Ns is, more specifically, a method of calculating the estimated ammonia storage amount Ns by subtracting an amount (set in advance by experiments or the like) of ammonia adhering to a wall surface of the exhaust passage (exhaust pipe) 11 between the urea water supply device 22, an amount (calculated based on the difference between the upstream $NO_X$ flow rate Nuf and the downstream $NO_X$ flow rate Ndf) of ammonia used for $NO_X$ purification in the selective reduction catalyst device 14, and the ammonia slip amount S from the amount of ammonia generated by hydrolyzing the urea water U injected from the urea water supply device 22.

In either one of the two control methods described above, it is possible to optimize the supply amount of the urea water U from the urea water supply device 22 while suppressing the ammonia slip amount S from the selective reduction catalyst device 14. The method without using the detection value of the downstream $NO_X$ concentration sensor 35 has an advantage that the control time can be further shortened, while the method using the detection value of the downstream $NO_X$ concentration sensor 35 has an advantage that the control accuracy can be further improved.

Further, in the exhaust gas purification system 1 for an internal combustion engine, the urea water supply control device 41 performs purification rate diagnosis (failure diagnosis) of the selective reduction catalyst device 14 by using the ammonia slip amount S calculated as described above. More specifically, the urea water supply control device 41 calculates a $NO_X$ purification rate P by the selective reduction catalyst device 14 based on the upstream $NO_X$ flow rate Nuf, the downstream $NO_X$ flow rate Ndf calculated by converting the downstream $NO_X$ concentration Ndd, and the ammonia slip amount S, and determines a failure in the selective reduction catalyst device 14 when the $NO_X$ purification rate P is equal to or lower than a determination threshold Pc set in advance by experiments or the like.

Here, the downstream $NO_X$ concentration sensor 35 may detect not only the concentration of nitrogen oxides ($NO_X$) contained in the exhaust gas G, but also the concentration of ammonia ($NH_3$). Therefore, a concentration Ndft (=Ndf−S) of the nitrogen oxides ($NO_X$) contained in the exhaust gas G which has passed through the ammonia slip catalyst device 15 is calculated by subtracting the ammonia slip amount S from the downstream $NO_X$ flow rate Ndf which is calculated by converting the detection value of the downstream $NO_X$ concentration sensor 35.

That is, the $NO_X$ purification rate P is calculated using the following formula (1).

[Formula 1]

$$P = 1 - \frac{\int Ndft}{\int Nuf} \quad (1)$$

Further, the determination threshold Pc may be set based on a control map (not shown) set in advance for each temperature and flow rate of the exhaust gas G passing through the selective reduction catalyst device 14, and may also be set as a value obtained by multiplying a diagnostic coefficient by the estimated value of the $NO_X$ purification rate of the selective reduction catalyst device 14 which is estimated according to the operating state of the engine 10.

According to such a configuration, the $NO_X$ purification rate P of the selective reduction catalyst device 14 can be calculated with high accuracy, so that the accuracy of the purification rate diagnosis (determination of a failure) of the selective reduction catalyst device 14 can be improved.

Figure 5:
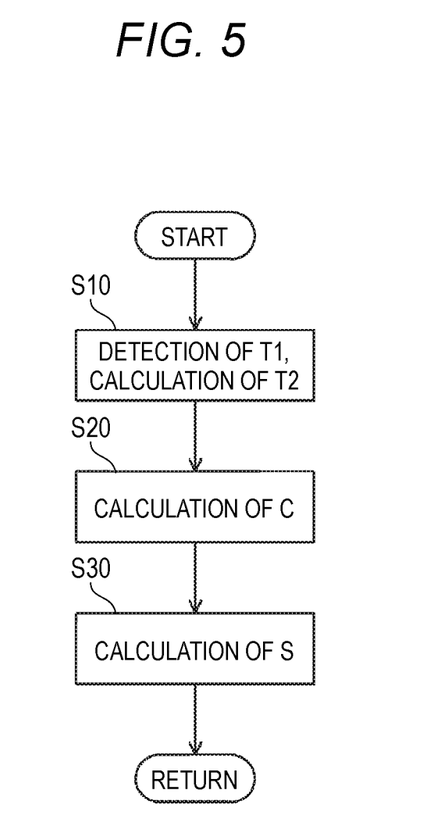
FIG. 5 is a diagram showing a control flow of an exhaust gas purification method for an internal combustion engine according to the embodiment of the present disclosure.

Next, FIG. 5 shows a control flow of the exhaust gas purification method for an internal combustion engine of the present disclosure based on the exhaust gas purification system 1 for an internal combustion engine. The control flow of FIG. 5 is shown as a control flow which is performed by calling from an advanced control flow at every preset control time according to the operating state of the engine 10, and then returning to the advanced control flow thereafter.

When the control flow in FIG. 5 starts, in step S10, the first temperature T1 is detected, the first temperature T1 being the temperature of the exhaust gas Gc which has passed through the second exhaust gas purification treatment device; and the second temperature T2 is estimated, the second temperature T2 being the temperature of the exhaust gas Gc which has passed through the second exhaust gas purification treatment device in the same operating state of the engine 10 as when the first temperature T1 is detected and in a state where the supply of the urea water U from the urea water supply device 22 is stopped. After the control of step S10 is performed, the process proceeds to step S20.

In step S20, the ammonia calorific value C which is the amount of heat generated in the ammonia slip catalyst device 15 by oxidation of ammonia is calculated based on the first temperature T1 and the second temperature T2 which are detected and estimated in step S10. The method of calculating the ammonia calorific value C has been described above, and the explanation thereof will be omitted here. After the control of step S20 is performed, the process proceeds to step S30.

In step S30, the ammonia slip amount S from the selective reduction catalyst device 14 is calculated based on the ammonia calorific value C calculated in the step S20. The method of calculating the ammonia slip amount S has been described above, and the explanation thereof will be omitted here. After the control of step S30 is performed, the process is returned and the present control flow ends.

Incidentally, in the control flow of FIG. 5, in a case of correcting the ammonia slip amount S with the total correction coefficient K, although not shown, first, the total correction coefficient K is calculated in parallel at any one of steps S10, S20, and S30. Then, after the step S30 ends, the process is not returned but proceeds to step S40 (not shown) so as to correct the ammonia slip amount S with the total correction coefficient K in step S40. After the control of step S40 is performed, the process is returned and the present control flow ends.

As described above, an exhaust gas purification method for an internal combustion engine of the present disclosure based on the exhaust gas purification system 1 for an internal combustion engine is a method in which the exhaust passage 11 of the internal combustion engine 10 includes, in order from an upstream side: a urea water supply device 22; and an exhaust gas purification treatment device, the exhaust gas purification treatment device including: a selective reduction catalyst device group including at least one selective reduction catalyst device 14; and an oxidation catalyst device 15 arranged at a downstream side of the selective reduction catalyst device group, the exhaust gas purification method including: detecting a first temperature T1 which is a temperature of exhaust gas Gc which has passed through the exhaust gas purification treatment device during supply of urea water U from the urea water supply device 22; estimating a second temperature T2 which is a temperature of the exhaust gas Gc which has passed through the exhaust gas purification treatment device in a state where the engine 10 is in a same operating state as when the first temperature T1 is detected and the supply of the urea water U from the urea water supply device 22 is stopped; and calculating, based on the first temperature T1 and the second temperature T2, the ammonia calorific value C which is an amount of heat generated by the oxidation catalyst device 15 by oxidation of ammonia which has been generated from the urea water U supplied from the urea water supply device 22, and calculating an ammonia slip amount S from the selective reduction catalyst device group based on the ammonia calorific value C.

According to the exhaust gas purification system 1 for an internal combustion engine configured as described above and the exhaust gas purification method for an internal combustion engine, the ammonia slip amount S at an outlet of the selective reduction catalyst device 14 can be calculated with high accuracy.

Then, by using the calculated value of the ammonia slip amount S, the diagnostic accuracy of the purification rate of the selective reduction catalyst device 14 and the accuracy of the supply control of the urea water U from the urea water supply device 22 can be improved.

Further, since it is not necessary to provide an ammonia concentration detection sensor at the outlet of the selective reduction catalyst device 14, the cost can be reduced.

Incidentally, in the present embodiment, the exhaust gas purification treatment device is described based on the configuration having one selective reduction catalyst device 14, but the effects of the present disclosure described above can also be achieved when the exhaust gas purification treatment device is provided with two or more selective reduction catalyst devices 14.

In this case, a temperature sensor or a $NO_X$ concentration sensor is further provided between the selective reduction catalyst devices 14, and it is preferable to correct the ammonia slip amount S by using the detection values since the calculation accuracy of the ammonia slip amount S can be further improved.

The present application is based on Japanese Patent Application No. 2016-092375 filed on May 2, 2016, contents of which are incorporated herein as reference.

INDUSTRIAL APPLICABILITY

The exhaust gas purification system for an internal combustion engine and the exhaust gas purification method for an internal combustion engine of the present disclosure is useful in that the ammonia slip amount in the outlet of the selective reduction catalyst device can be calculated with high accuracy.

DESCRIPTION OF REFERENCE NUMERALS 1 exhaust gas purification system for internal combustion engine
10 engine (internal combustion engine)
11 exhaust passage
14 selective reduction catalyst device
15 ammonia slip catalyst device (oxidation catalyst device)
22 urea water supply device
32 upstream $NO_X$ concentration sensor (upstream $NO_X$ concentration detecting device)

34 downstream temperature sensor (downstream temperature detecting device)
35 downstream $NO_X$ concentration sensor (downstream $NO_X$ concentration detecting device)
41 urea water supply control device
T1 first temperature
T2 second temperature
C ammonia calorific value
S ammonia slip amount
Sc set threshold for ammonia slip amount
P $NO_X$ purification rate
Pc determination threshold for $NO_X$ purification rate
F flow rate of exhaust gas
Nud upstream $NO_X$ concentration
Nuf upstream $NO_X$ flow rate
Ndd downstream $NO_X$ concentration
Ndf downstream $NO_X$ flow rate
Ns estimated ammonia storage amount
R ratio of nitrogen monoxide to nitrogen dioxide contained in exhaust gas
K total correction coefficient
k1 first correction coefficient
k2 second correction coefficient
k3 third correction coefficient
k4 fourth correction coefficient
k5 fifth correction coefficient
U urea water
G exhaust gas of engine
Gc purified exhaust gas

The invention claimed is:

1. An exhaust gas purification system for an internal combustion engine, in which an exhaust passage of the internal combustion engine includes, in order from an upstream side: a urea water injection valve; an exhaust gas purification treatment device; and a downstream temperature detecting device, the exhaust gas purification treatment device including: a selective reduction catalyst device group including at least one selective reduction catalyst device; and an oxidation catalyst device arranged at a downstream side of the selective reduction catalyst device group,
   wherein an electronic control device which controls the exhaust gas purification system is configured to:
      detect, by the downstream temperature detecting device, a first temperature which is a temperature of exhaust gas which has passed through the exhaust gas purification treatment device during supply of urea water from the urea water injection valve;
      calculate, from preset data, a second temperature which is a temperature of exhaust gas which has passed through the exhaust gas purification treatment device in a state where the engine is in a same operating state as when the first temperature is detected and the supply of the urea water from the urea water injection valve is stopped; and
      calculate, based on the first temperature and the second temperature, an ammonia calorific value which is an amount of heat generated by the oxidation catalyst device by oxidation of ammonia which has been generated from the urea water supplied from the urea water injection valve, and calculate an ammonia slip amount from the selective reduction catalyst device group based on the ammonia calorific value.

2. The exhaust gas purification system for an internal combustion engine according to claim 1,
   wherein the electronic control device is configured to calculate a urea water supply amount based on the calculated ammonia slip amount and supply the urea water by the calculated urea injection valve amount, or to perform failure diagnosis on the urea water injection valve and the exhaust gas purification treatment device based on the calculated ammonia slip amount.

3. The exhaust gas purification system for an internal combustion engine according to claim 1,
   wherein the exhaust passage includes an upstream $NO_X$ concentration detecting device at the upstream side of the urea water injection valve, and
   wherein the electronic control device is configured to:
      calculate a total correction coefficient based on: the first temperature; a flow rate of the exhaust gas passing through the exhaust passage; an upstream $NO_X$ concentration which is a detection value of the upstream $NO_X$ concentration detecting device; an upstream $NO_X$ flow rate calculated from the flow rate of the exhaust gas and the upstream $NO_X$ concentration; an estimated ammonia storage amount which is an estimated value of an amount of ammonia stored in the selective reduction catalyst device group; and a ratio of nitrogen monoxide to nitrogen dioxide contained in exhaust gas flowing into the selective reduction catalyst device group; and
      correct the ammonia slip amount based on the calculated total correction coefficient.

4. The exhaust gas purification system for an internal combustion engine according to claim 3,
   wherein the electronic control device calculates the total correction coefficient based on:
      a first correction coefficient calculated based on the first temperature and the flow rate of the exhaust gas;
      a second correction coefficient calculated based on the first temperature and the upstream $NO_X$ concentration,
      a third correction coefficient calculated based on the first temperature and the upstream $NO_X$ flow rate,
      a fourth correction coefficient calculated based on the first temperature and the estimated ammonia storage amount, and
      a fifth correction coefficient calculated based on the first temperature and the ratio of nitrogen monoxide to nitrogen dioxide.

5. The exhaust gas purification system for an internal combustion engine according to claim 1,
   wherein the electronic control device is configured to:
      correct a urea water supply amount from the urea water injection valve based on the ammonia slip amount so that the ammonia slip amount is not equal to or larger than a preset threshold.

6. The exhaust gas purification system for an internal combustion engine according to claim 1,
   wherein the exhaust passage includes a downstream $NO_X$ concentration detecting device at the downstream side of the exhaust gas purification treatment device,
   wherein the electronic control device is configured to:
      correct a urea water supply amount from the urea water injection valve based on the ammonia slip amount, a downstream $NO_X$ concentration which is a detection value of the downstream $NO_X$ concentration detecting device, and the estimated ammonia storage amount which is an estimated value of an amount of ammonia stored in the selective reduction catalyst device group so that the ammonia slip amount is not equal to or larger than a preset threshold.

7. The exhaust gas purification system for an internal combustion engine according to claim 6,
   wherein the electronic control device is configured to:

calculate the estimated ammonia storage amount based on the ammonia slip amount and the downstream $NO_X$ concentration.

8. The exhaust gas purification system for an internal combustion engine according to claim 6, wherein the electronic control device is configured to:
calculate a $NO_X$ purification rate by the selective reduction catalyst device group based on the upstream $NO_X$ flow rate, a downstream $NO_X$ flow rate calculated by converting the downstream $NO_X$ concentration, and the ammonia slip amount, and
determine a failure in the selective reduction catalyst device group when the $NO_X$ purification rate is equal to or lower than a preset determination threshold.

9. An exhaust gas purification method for an internal combustion engine in which an exhaust passage of the internal combustion engine includes, in order from an upstream side: a urea water injection valve; and an exhaust gas purification treatment device, the exhaust gas purification treatment device including: a selective reduction catalyst device group including at least one selective reduction catalyst device; and an oxidation catalyst device arranged at a downstream side of the selective reduction catalyst device group,
the exhaust gas purification method comprising:
detecting a first temperature which is a temperature of exhaust gas which has passed through the exhaust gas purification treatment device during supply of urea water from the urea water injection valve;
calculating, from preset data, a second temperature which is a temperature of exhaust gas which has passed through the exhaust gas purification treatment device in a state where the engine is in a same operating state as when the first temperature is detected and the supply of the urea water from the urea water injection valve is stopped; and
calculating, based on the first temperature and the second temperature, an ammonia calorific value which is an amount of heat generated by the oxidation catalyst device by oxidation of ammonia which has been generated from the urea water supplied from the urea water injection valve, and calculating an ammonia slip amount from the selective reduction catalyst device group based on the ammonia calorific value.

* * * * *